United States Patent [19]

Gerritsen et al.

[11] 4,292,198

[45] Sep. 29, 1981

[54] HETEROGENEOUS CATALYST ON THE BASIS OF AN ORGANOMETALLIC COMPLEX

[75] Inventors: Leendert A. Gerritsen, Hendrik Ido Ambacht; Joseph J. F. Scholten, Sittard, both of Netherlands

[73] Assignee: Stamicarbon, B.V., Geleen, Netherlands

[21] Appl. No.: 139,662

[22] Filed: Apr. 14, 1980

[30] Foreign Application Priority Data

Apr. 14, 1979 [NL] Netherlands .......................... 7902964

[51] Int. Cl.³ .......................... B01J 31/06; B01J 31/20
[52] U.S. Cl. .................................... 252/428; 252/430; 252/431 R; 252/431 P; 568/454
[58] Field of Search .................. 252/428, 430, 431 R, 252/431 P

[56] References Cited

U.S. PATENT DOCUMENTS

| | | | |
|---|---|---|---|
| 3,787,459 | 1/1974 | Frankel | 252/431 P X |
| 3,832,404 | 8/1974 | Allum et al. | 252/431 P X |
| 3,937,742 | 2/1976 | Yoo | 252/430 X |
| 4,193,942 | 3/1980 | Gerritsen et al. | 252/431 P X |

*Primary Examiner*—Patrick Garvin
*Attorney, Agent, or Firm*—Cushman, Darby & Cushman

[57] ABSTRACT

An improved catalyst composition for the hydroformylation of olefinically unsaturated compounds using catalytically active organometallic complexes wherein said complexes are dissolved in a ligand-forming compound and impregnated into a porous solid carrier material which is essentially free of alkali metal ions and acid or basic groups which would otherwise be reactive with the organo-metallic commplex.

9 Claims, No Drawings

HETEROGENEOUS CATALYST ON THE BASIS OF AN ORGANOMETALLIC COMPLEX

BACKGROUND OF THE INVENTION

This invention relates to catalysts consisting of a porous solid carrier material the pores of which contain a catalytically active organometallic complex dissolved in a ligand-forming compound, and to the use of such catalysts, for instance, for the hydroformylation of olefinically unsaturated compounds.

Catalysts of the general type described above are described in Netherlands patent application No. 7700554, published July 24, 1978 and corresponding to U.S. application Ser. No. 870,582 to Gerritsen et al, filed Jan. 18, 1978 and now Pat. No. 4,193,942, the disclosure of which is hereby incorporated by reference. Although the hydroformylation by means of these catalysts offers advantages over the known homogeneous catalysis with the same organometallic complexes, there is still room for improvement on some points. The time needed for the non-activated catalyst to reach maximum activity is long in many instances. Also, with a low degree of filling of the pores these catalysts show a relatively low activity, per gram of metal present in complex form. In addition, there is some aldol condensation of the aldehydes formed in the hydroformylation.

OBJECT AND SUMMARY OF THE INVENTION

It is the object of the invention to provide catalysts which do not exhibit these disadvantages or exhibit them to a considerably smaller extent.

According to this invention, this object is achieved by selecting, as the carrier material for the catalyst (i.e., the solid porous carrier material the pores of which contain a solution of a catalytically active metal complex in a ligand-forming compound), a material that has an organophilic surface and which is wholly or virtually free of alkali metal ions and of acid or basic groups that can react with the organometallic complex.

This particular choice of carrier material proves to offer several unpredictable advantages. The activity is enhanced, especially if the degree of filling of the pores is low. On account of the organophilic nature of the carrier surface, the wetting angle of the liquid is small in relation to the surface area, and this provides a better retention of the solution in the pores and a lower partial vapour pressure of the solvent in the pores. These effects counteract loss of the metal complex and of the solvent. Further, due to the inert nature of the surface, the aldol condensation retention is strongly suppressed.

DESCRIPTION OF THE CARRIER MATERIAL

Various materials can be used as carrier for a catalyst according to the invention. Suitable as carriers are, notably (a) organically cross-linked porous polymers substantially free from alkali or alkaline earth metal ions or acid anions, (b) silica rendered hydrophobic by heating, or silica/alumina materials substantially free from alkali or alkaline earth metal ions, and (c) inorganic materials naturally containing acid or basic groups at their surface, which groups have been converted into inert groups by treatment with a suitable reagent.

Eligible organic polymers are, for instance, cross-linked polyacrylates and cross-linked polystyrene, in particular the macroporous polystyrene resins cross-linked by means of divinyl benzene. The polymers may contain ionic contaminants, for instance, stemming from the polymerization catalysts. Thus, preferably, they should be thoroughly washed before the carrier is impregnated with a solution of the metal complex. The particular advantage offered by these organic polymeric resins is that they are very distinctly organophilic. Disadvantages are, however, that they cannot be used in a fluidized bed, and in a fixed bed can give rise to problems of heat removal, and that they can soften at temperatures above about 150° C.

It is preferred to use inorganic carriers. A suitable type of silica is that which has been rendered hydrophobic by a thermal treatment at a temperature of at least 700° C. (for such a treatment see S. Kondo et al, Journal of Colloid and Interface Science, Vol. 55, No. 2 (1976), p. 421). The material must be completely or virtually free of alkali metal ions—on the one hand to prevent sintering during the thermal treatment, and on the other to suppress the aldol condensation of aldehydes formed in the hydroformylation. Suitable types of silica are also those disclosed in Dutch patent application No. 7807221 published Jan. 22, 1979 which corresponds to U.S. application Ser. No. 924,747 to Scholten et al, filed July 14, 1978 and now U.S. Pat. No. 4,224,189. Also very suitable are carriers which naturally possess basic or acid groups at their surface, such as silica, silica-alumina, or alumina, and which have been treated with a suitable reagent so that the reactive surface groups thereon have been converted into inert groups. The reagent used to induce the said inert condition may be a silane, containing on the silicon atom at least one substituent which reacts with the reactive surface groups. Examples of such substituents are halogen atoms, e.g., chlorine, fluorine or bromine, and alkoxyl groups. Further groups bonded to the silica-silicon may be alkyl, aryl of aralkyl groups, which themselves may, in turn, carry one or more non-interfering substituents, e.g., phosphine groups. Suitable compounds may be represented by the formulas $Si(OR')_4$ or $R_nSi(OR')_{n-4}$ or $R_nRiX_{4-n}$, in which R is a substituted or non-substituted $C_{1-12}$ alkyl of aryl group, R' is a $C_{1-8}$ alkyl or aryl group, X is a halogen atom, and n is equal to 1, 2 or 3. It is also possible to apply organo-alkoxy-oligosiloxanes, e.g., those having the formula $R—Si(X)(Y)-[OSi(R)(Y)]_mO—Si(X)(Y)—R$, in which X and Y represent an —OR' or —R group, m is equal to 0 or 1, and R and R' have the meanings described above. The use of silanized silica as a filler in polymers is known already from i.a. Netherlands patent application No. 7116033, published May 26, 1972, and U.S. Pat. Nos. 3,948,676, 4,068,024, and 4,164,509. Suitable silanes are, for instance, trimethylchlorosilane, triethylchlorosilane, triphenylchlorosilane, diethyldichlorosilane, diphenyldichlorosilane, phenyltrichlorosilane, methyldiphenylchlorosilane, triphenylmonoethoxysilane, ethyl-triethoxysilane. The interfering groups present at the surface of the carrier material can also be reacted with glycols containing 2–18 carbon atoms, as described in the U.S. Pat. No. 2,921,913.

The dimensions of the carrier material particles may vary from about 0.01 cm to 5.0 cm. In a fluidized bed particles of between 0.01 and 0.1 mm will preferably be used, in a fixed bed the particles should be between 0.2 and 2.0 cm.

The pore volume of the carriers, after any pretreatment which has been applied, is in general between 0.01 and 5 cm$^3$ per gram of carrier material. The diameter of the pores may in general be between 2 and 2000 nm. By preference, use is made of a carrier material in which at least part of the pores have a diameter smaller than 10 nm.

The degree of loading of the catalyst may be between 0.05 and 0.95 cm$^3$ of solution per cm$^3$ of pore volume. By preference, a degree of loading of between 0.2 and 0.8 cm$^3$ of solution per cm$^3$ of pore volume is applied. With the catalysts according to the invention, the degree of loading may be relatively low, because with a low degree of loading the activity per gram of metal is higher than with the known catalysts. A relatively low degree of loading, e.g., between 0.2 and 0.5, offers the advantage that the solution of the complex is present in the smallest pores, in which it is retained particularly strongly, and that the removal of heat is easier.

DESCRIPTION OF THE LIGAND/METAL COMPLEX

Suitable metals for use as the central metal atom in the catalytically-active organometallic complex are the transition metals from the Groups V, VI, VII and VIII of the Periodic System according to Mendeleev, e.g., Re, Fe, Ru, Os, Co, Rh, Ir, Ni, Pd and Pt, particularly rhodium, cobalt, ruthenium and iridium. These metals may also be used in the form of mixtures.

Suitable as ligands in the abovementioned organometallic complex, besides ligands like CO, H and C— and $\pi$-bonded alkenes, are organic compounds containing in the molecule an atom from the Groups VB and VIB of the Periodic System according to Mendeleev with a free electron pair, e.g., P, S, B, Se, Te, Sb, As. Also suitable are, for instance, the halogens, such as Cl, Br and I, halides of tin and germanium II, acid radicals such as acetate, propionate, and easily displaceable ligands such as acetylacetonate, hydrogen, carbon monoxide, tetrahydrofurane and diolefin.

As typical complexes can be mentioned rhodiumhydridocarbonyltris(triphenylphosphine), cobalthydridotetracarbonyl-rhodiumbis(triphenylphosphine)-carbonylchloride, rhodiumhydridobiscarbonyl-bis(triphenylphosphine), and rhodiumcarbonylchloridebis(triphenylarsine).

Solvents for the metal complex that may be used according to the invention are compounds whose vapor pressure under reaction conditions is lower than 1.3 mbar and which are capable of acting as ligands in a complex of a transition metal. These ligand-forming compounds, here also to be called "free ligands", need not be the same as the ligands present in the original transition metal complex. They may also replace one or more ligands of the metal complex. It may also occur that under operating conditions the catalytically-active metal complex differs from the metal compound originally dissolved.

Suitable as ligand-forming compounds to be employed as such solvent are in the first place the organic compounds of phosphorous, antimony and arsenic containing a free electron pair, for instance, compounds of phosphorous having the general formula PR$^1$R$^2$R$^3$ or P(OR$^1$)(OR$^2$)(OR$^3$), in which R$^1$, R$^2$ and R$^3$ represent aliphatic, aromatic or alkyl-aromatic hydrocarbon groups having from 1–20 carbon atoms, and the corresponding compounds of arsenic and antimony as well.

Examples in point are triethylphosphine, tributylphosphine, tri-cyclohexylphosphine, methyldiphenylphosphine, diethylphenylphosphine, triphenylphosphine, tri-p-tolylphosphine, tri-naphthylphosphine, ethylene-di(dimethylphosphine), trimethylphosphite, trimethylolpropanephosphite, triphenylphosphite, triphenylarsine, phenyldimethylarsine, and triphenylstibine.

The concentration of the organometallic complex in the free ligand may vary within wide limits. The upper limit is determined by the solubility under reaction conditions of the organometallic complex in the free ligand, and the lower limit is determined mainly by economic and commercial considerations. The area within which the concentration may thus vary is, for instance, $10^{-1}$ to $10^{-5}$ moles/liter, more in particular $10^{-2}$ to $10^{-4}$ moles/liter.

PREPARATION OF THE CATALYST-IMPREGNATED CARRIER

In the preparation of the catalyst, the carrier may be impregnated with a solution of the catalytically-active metal complex, or a precursor thereof, in a free ligand without other solvents. Exactly so much solution is then used that the desired degree of loading is obtained immediately. However, it is easier to use an auxiliary solvent in the preparation of the catalyst, i.e., to impregnate the carrier with a solution of the catalytically-active metal complex or a precursor thereof in a mixture of one or more free ligands with a volatile solvent, and thereafter to remove the volatile solvent again.

By the term "inert volatile solvent" as used herein, there is to be understood a component which does not enter into a strong coordination with the organometallic complex, has a vapor pressure higher by at least a factor 10 than the vapor pressure of the ligand, and also combines with the free ligand and the organometallic complex to form a homogeneous solution. Suitable such solvents are, for instance, lower alkanols, e.g., methanol, ethanol, and monocyclic aryls, e.g., benzene, toluene, xylene.

The ratio between free ligand and the inert volatile solvent is determined by the degree of catalyst loading desired. For instance, with a degree of loading of 0.5, exactly 50% of the resulting catalyst solution will consist of liquid solvent. Just so much catalyst solution is used in the impregnation that in the first instance the entire pore volume of the carrier material is filled. If the ligand is present in a solidified state at room temperature, the mixture consisting of organometallic complex, free ligand and inert volatile solvent is first heated to a temperature at which a homogeneous solution is obtained. The hot, homogeneous catalyst solution is thus slowly added to the likewise heated carrier material with exclusion of atmospheric oxygen and with stirring. Previously, the carrier material has also been raised to a temperature which is at least equal to the temperature of the catalyst solution used.

The impregnation can also be carried out in vacuo.

The resulting free-flowing catalyst is now freed of the volatile solvent in vacuo, by passing an inert gas therethrough, or in situ, in the reactor, at a temperature at which the volatile solvent evaporates, which temperature preferably is higher than the melting point of the free ligand. If this procedure is followed, it is possible for the free ligand to redistribute, if necessary, in the carrier material already during the drying of the catalyst.

DESCRIPTION OF THE HYDROFORMYLATION PROCESS

Unsaturated organic compounds that can be converted by application of the process according to the invention are terminally or internally unsaturated, linear of branched aliphatic mono-olefins with 2 to 20 carbon atoms, conjugated or non-conjugated diolefins with 6 to 20 carbon atoms, olefinically unsaturated aldehydes with 3 to 20 carbon toms and the acetals derived therefrom, olefinically unsaturated ketones with 4 to 20 carbon atoms and the ketals derived therefrom, and corresponding unsaturated esters and unsaturated nitriles.

Examples in point are ethylene, propylene, butylene-1, isobutylene, butylene-2, hexene-1, octene-1, octene-4, diisobutylene, cyclohexene, styrene, butadiene, pentadiene 1-4, cyclo-octadiene, acrolein, crotonaldehyde, cinnamaldehyde, 1,1-dimethoxy-propylene-2, methylvinylketone, methylacrylate, methylmethacrylate, diethylmaleate, acrylonitrile. The process according to the invention is particularly suitable for the hydroformylation of, i.e., olefins, unsaturated aldehydes and acetals derived therefrom.

The reaction temperature may vary from 20° to 300° C., depending upon the free ligand, organometallic complex, olefin, and total pressure employed. If the temperature is too high, the free ligand and the organometallic complex volatilize or decompose; if it is too low, the olefin or the resultant aldehyde condensates in the reactor, and the activity becomes too low. The preferred temperature is in the range of 40° to 200° C.

The total pressure may vary from 1 to 50 bar, depending upon the olefin employed. By preference, the total pressure is, however, about 1 to 20 bar, as at this low partial pressure a high activity and selectivity and low investment costs can be realized.

The following Examples will illustrate the practice of the above teachings, although many variations thereof are also possible within the scope of this invention.

EXAMPLE I

A catalyst was prepared with the use of a macroreticular polystyrene resin cross-linked by means of divinylbenzene (the commercial product Amberlite XAD-2, by Rohm & Haas Comp.), having a pore volume of 0.693 cm$^3$/g, a specific surface of 300 m$^2$/g, and a mean pore diameter of 9 nm. The material consisted of particles 0.42 to 0.50 mm in size.

Various catalysts were prepared in the way described in Netherlands patent application No. 7700554 by diluting a solution of RhHCO(PPh$_3$)$_3$ in triphenylphosphine with benzene, impregnating the carrier material with the resulting solution, and next removing the benzene by evaporation. Variations in the amount of benzene employed allows control of the degree to which the pores are filled with the solution of the rhodium complex in triphenylphosphine. In all cases, the Rh concentration was 5.51 mmoles/liter, corresponding to 744 moles of triphenylphosphine per mole of Rh. Various catalysts having loading degrees from 0.05 to 1.0 were prepared.

These catalysts were then used for the hydroformylation of ethylene at 90° C. and a pressure of 12.15 bar, a molar H$_2$:CO:C$_2$H$_4$ ratio of 1:1:1, and a catalyst load W/FC$_2$ of 0.145×10$^{-3}$ g Rh s/cm$^3$ C$_2$H$_4$. The results have been compiled in Table 1. For comparison, the Table also shows the results obtained under the same conditions with a catalyst according to Dutch Patent Application 7700554, consisting of silica (type 000-3E of AKZO) impregnated with the same rhodium complex solution as disclosed above.

The catalyst load is expressed as the ratio of the amount of rhodium (calculated as metal, in grammes) present in the reactor to the amount of olefin introduced per second, expressed in cm$^3$ (normal volume, at 0,1 MPa and 25° C.). The activity of the catalyst is expressed as cm$^3$ (normal volume) of olefin converted per gramme of rhodium per second.

TABLE 1

| Expt. | Degree of Loading | Activity in cm$^3$ Ethylene Converted per g Rh s | | Initiation Time (Hours) |
|---|---|---|---|---|
| | | A.I.** | Comp. Expt. | |
| 1 | 0.05 | 445 | | 20 |
| 2 | 0.10 | 420 | | 45 |
| 3* | 0.10 | | 74 | n.d. |
| 4 | 0.30 | 388 | | |
| 5* | 0.30 | | 180 | n.d. |
| 6 | 0.50 | 360 | | |
| 7* | 0.50 | | 180 | n.d. |
| 8 | 0.65 | 340 | | 50 |
| 9 | 0.70 | 335 | | |
| 10* | 0.70 | | 170 | n.d. |
| 11 | 0.90 | 308 | | 90 |
| 12* | 0.90 | | 155 | n.d. |
| 13 | 1.00 | 275 | | 60 |
| 14* | 1.00 | | 145 | n.d. |

*Comparative Experiments
**A.I. = according to this invention.
n.d. = not determined. For this type of comparative catalyst, the initiation time usually is between 100 and 250 hours.

EXAMPLE II

A catalyst (XAD-2 as carrier) obtained by the process described in Example I, having a degree of filling of 0.65, was used for the hydroformylation of propylene at 90° C., a pressure of 16.20 bar, a molar H$_2$:CO:C$_3$H$_6$ ratio of 1:1:1, and a catalyst load of 1.312×10$^{-3}$ g Rh s/cm$^3$ C$_3$H$_6$. Constant activity of 8.4 cm$^3$ C$_3$H$_6$/g Rh s and a selectivity n/iso of 8.5 were reached after 30 hours.

For comparison, according to prior art (using silica 000-3E as carrier) with the same degree of filling was tested under the same conditions. This catalyst attained an activity of only 5.8 cm$^3$ C$_3$H$_6$/g Rh s and a selectivity of only 7.7 after 200 hours.

EXAMPLE III

A carrier with a surface rendered inert and organophilic by chemical modification was prepared in the way described hereafter. In a Dean & Stark assembly 10 g silica (type 000-3E, by AKZO) was dried by distillation with xylene free of oxygen and water. Then 10 ml of triethoxyphenylsilane was added, after which the mixture was refluxed for 7 hours. The silica was removed by filtration, and non-converted triethoxyphenylsilane was removed by extraction in a Soxhlet apparatus with 500 ml of fresh xylene followed by washing three times with 50 ml of benzene and three times with 50 ml of diethylether.

The modified silica was dried for 16 hours at 45° C. and 14 mbar. Before the silanization the pore volume was 0.85 cm$^3$/g. After the silanization the pore volume was 0.74 cm$^3$/g and the product contained 2.06% wt. carbon and 0.30% wt. hydrogen.

This carrier was then used to produce a catalyst the pores of which contained a solution of 0.0200 g of RhHCO(PPh$_3$)$_3$ in 4.2321 g of triphenylphosphine. The degree of loading was 0.56.

This catalyst was then used for the hydroformylation of ethylene at 90° C. and 12.15 bar, a molar $H_2:CO:C_2H_4$ ratio of 1:1:1, and a catalyst load of $0.572 \times 10^{-3}$ g Rh s/cm$^3$ $C_2H_4$.

The conversion was about 10%. The change of the activity in time is shown in Table 2. This Table also shows the activity of a comparable catalyst not obtained by the method according to the invention (unmodified silica 000-3E used as carrier).

TABLE 2

| Time (hrs.) | 10 | 20 | 30 | 50 | 70 | 90 | 170 |
|---|---|---|---|---|---|---|---|
| Catalyst, A.I., Activity in cm$^3$ $C_2H_4$/g Rh s | 160 | 166 | 168 | 170 | 174 | 176 | 180 |
| Comp. Catalyst Activity cm$^3$ $C_2H_4$/g Rh s | 66 | 85 | 104 | 142 | 164 | 169 | 169 |

The catalyst was also used for the hydroformylation of propylene at 90° C. and 16.2 bar, a molar $H_2:CO:C_3H_6$ ratio of 1:1:1 and a load of $1.027 \times 10^{-3}$ g Rh s/cm$^3$ $C_3H_6$. After 10 hours, the catalyst had already reached a constant activity of 6.71 cm$^3$ $C_3H_6$/g Rh s at a selectivity n/iso of 8.83.

EXAMPLE IV

In the way described in Example III silica (type 000-3E) was modified by reaction with triphenylchlorosilane. The carrier obtained in this way contained 6.5% wt. carbon and 0.4% wt. hydrogen. With this carrier, catalysts could be prepared that gave about the same results as those prepared as described in Example III.

EXAMPLE V

A very suitable carrier was obtained by heating low-sodium silica for 5 hours at 850° C. This silica has a specific surface of 100 m$^2$/g, a pore volume of 0.99 cm$^3$/g, a mean pore diameter $(dV/dR)_{max}$ of 17 nm, and a Na content of 96 ppm. In the way described in Example I, a catalyst was prepared by loading this silica with a solution of RhHCO(PPh$_3$)$_3$ in triphenylphosphine (753 moles of PPh$_3$ per mole of Rh). The degree of loading was 0.79.

This catalyst was used for the hydroformylation of ethylene at 90° C. and a pressure of 12.15 bar, a molar $H_2:CO:C_2H_4$ ratio of 1:1:1, and a catalyst load W/FC$_2$ of $0.570 \times 10^{-3}$ g Rh s/cm$^3$ $C_2H_4$. For comparison, a prior art catalyst (carrier silica 000-3E, degree of loading 0.75, P/RH=756) was tested under the same conditions. The results have been compiled in Table 3. The use of hydrophobic silica as carrier thus proves to cause the activity to increase and the initiation time to decrease.

TABLE 3

| Time (hrs.) | 10 | 20 | 30 | 50 | 70 | 90 | 170 |
|---|---|---|---|---|---|---|---|
| Catalyst, A.I. Activity cm$^3$ $C_2H_4$/g Rh s | 185 | 190 | 190 | 190 | 193 | not determined | |
| Comp. Catalyst Activity cm$^3$ $C_2H_4$/g Rh s | 84 | 95 | 113 | 126 | 152 | 166 | 175 |

EXAMPLE VI

The two catalysts used in Example V were next used for the hydroformylation of propylene at 90° C., a pressure of 16.2 bar, a molar $H_2:CO:C_3H_6$ ratio of 1:1:1, and a catalyst load of $0.984 \times 10^{-3}$ g Rh s/cm$^3$ $C_3H_6$. The catalyst on hydrophobic silica attained constant activity already after 15 hours, at a selectivity of 9.0. The catalyst based on silica 000-3E attained constant activity only after about 250 hours, at a selectivity of only 7.5.

EXAMPLE VII

The tendency of a number of carrier materials to promote the aldol condensation was tested in the way described below.

In glass sampling tubes 0.4 g of carrier material and 10 cm$^3$ of freshly distilled n-propionaldehyde were added together, after which the tubes were sealed by fusing and stored for some time at 90° C. After a certain lapse of time the sampling tube to be examined was rapidly cooled to room temperature and opened. The percentage of propionaldehyde converted was determined by gas chromatographic analysis. The reaction products consisted mainly of 2-methylpentanal and 3-hydroxy-2-methylpentanal. The carrier materials examined were:

1. γ-alumina (type 005-0.75 E ex AKZO), Na content 815 ppm.
2. Silica-alumina (type LA-30 ex AKZO), Na content 725 ppm.
3. Silica (type 000-3F ex AKZO), Na content 4900 ppm.
4. Silica (type 000-3E), silanized as in Example IV.
5. Silica (type D-11-11, ex BASF), Na content <1000 ppm.
6. Silica S, as used in Example V, Na content 96 ppm.
7. Polystyrene/divinylbenzene resin (type XAD-2, ex Rohm & Haas), Cl content 1.2% wt.
8. Same as 7., purified to Na content and Cl content <100 ppm.

The results have been compiled in Table 4.

TABLE 4

| Sample No. | 1 | 2 | 3 | 4 | 5 | 6 | 7 | 8 |
|---|---|---|---|---|---|---|---|---|
| Time (Hrs.) | | | | | | | | |
| 2 | 9.78 | 3.85 | 4.63 | 1.77 | 3.18 | 0.26 | 1.19 | 0.97 |
| 5 | 16.05 | 6.60 | 7.39 | 3.5 | 4.0 | 0.51 | 2.68 | 1.66 |
| 10 | 25.50 | 10.90 | 13.30 | 6.0 | 6.00 | 1.00 | 5.02 | 2.94 |
| 20 | 40.67 | 18.49 | 23.93 | 10.0 | 11.2 | 1.51 | 9.14 | 4.45 |
| 30 | 50.85 | 24.70 | 32.70 | 14.5 | 15.0 | 1.91 | 12.56 | 5.69 |
| 40 | 56.06 | 29.55 | 39.84 | 18.5 | 18.5 | 2.10 | 15.26 | 6.42 |
| 50 | 56.30 | 33.03 | 45.27 | 22.5 | 22.0 | 2.10 | 17.25 | 6.65 |

The figures indicate the percentage of n-butyraldehyde which was converted at time t, as related to the original quantity.

While the values found can only give a relative indication of what may result in a gas-phase hydroformylation, with short retention times, still it is clear that the γ-alumina and silica-alumina, with their acid groups, strongly promote the aldol condensation, and that a higher sodium content also has this effect (compare samples 3 and 5). Most remarkable is the reduction of the aldol formation effected by silanization of the silica surface, even if the silica contains relatively much sodium (compare samples 3 and 4). It is also very clear that the presence of low-Na hydrophobic silica (sample 6) has a negligible influence on the aldol formation.

What is claimed is:

1. In a catalyst composition composed of a solid porous particulate carrier material impregnated with a solution of a catalytically active organometallic complex in an excess amount of ligand-forming compound, the improvement consisting essentially in said carrier having an organophilic surface which is completely or virtually free of alkali metal ions and acid or basic groups which would be reactive with the said organometallic complex.

2. Catalyst composition according to claim 1, wherein the carrier material is of the group of
  (a) porous, solid, cross-linked polymers freed of polar contaminants,
  (b) silica rendered hydrophobic by a thermal treatment, and
  (c) silica or silica-alumina the surface of which has been treated with a reagent that irreversibly converts the reactive groups on the carrier surface into inert groups.

3. Catalyst according to claim 1 or 2, wherein the carrier material is a macroporous polystyrene resin, cross-linked by means of divinylbenzene and free of ionic contaminants.

4. Catalyst according to claim 1 or 2, wherein the carrier material is silica or silica-alumina the reactive surface groups of which have been converted into groups inert with respect to the organometallic complex by reaction with a silane compound that possesses at least one substituent capable of reacting with the reactive surface groups, and, further, is free of groups interfering with the activity of the organometallic complex.

5. Catalyst according to claim 4, wherein use is made of a silane compound having the formula $Si(OR')_4$, $R_n SiX_{4-n}$, or $R_n Si(OR)_{4-n}$, in which R is a substituted or non-substituted $C_{1-12}$ alkyl or aryl group, R' is a $C_{1-18}$ alkyl or aryl group, X is a halogen atom, and n is equal to 1, 2 or 3.

6. Catalyst according to claim 1 or 2, wherein the carrier material is a silica containing less than 100 ppm of sodium and rendered hydrophobic by heating to a temperature above 700° C.

7. A catalyst composition consisting of particles of a solid porous carrier material the pores of which are impregnated with a solution of a catalytically active organometallic complex, having as the central metal atom in said complex a metal selected from Groups V, VI, VII, and VIII of the Periodic Table or mixtures thereof, in an excess amount of ligand-forming compound, wherein said carrier has an organophilic surface which is completely or virtually free of alkali metal ions and acid or basic groups which would be reactive with said organometallic complex.

8. Catalyst composition according to claim 7, wherein the central metal atom is selected from the group consisting of rhodium, cobalt, ruthenium, iridium, and mixtures thereof.

9. Catalyst composition according to claim 1 or 8 wherein the ligand-forming compound has a vapor pressure under reaction conditions of less than 1.3 mbar and corresponds to the formula $PR^1R^2R^3$ or $P(OR^1)(OR^2)(OR^3)$ in which $R^1$, $R^2$, and $R^3$ represent aliphatic, aromatic, or alkyl-aromatic $C_{1-20}$ hydrocarbons.

* * * * *